United States Patent [19]
Bergano et al.

[11] Patent Number: 5,111,322
[45] Date of Patent: May 5, 1992

[54] POLARIZATION MULTIPLEXING DEVICE WITH SOLITONS AND METHOD USING SAME

[75] Inventors: Neal S. Bergano, Lincroft; Stephen G. Evangelides, Jr., both of Middletown; Linn F. Mollenauer, Colts Neck, all of N.J.

[73] Assignee: AT&T Bell Laboratories, Murray Hill, N.J.

[21] Appl. No.: 680,456

[22] Filed: Apr. 4, 1991

[51] Int. Cl.[5] .......................... G02B 6/28; H04J 11/00
[52] U.S. Cl. .................................. 359/122; 359/129; 359/135; 359/184; 359/188; 359/140; 385/1; 385/45; 385/47; 385/36; 385/24
[58] Field of Search .............. 350/96.15, 96.16, 96.29, 350/96.30; 370/1, 2, 3, 4; 455/608, 610, 612; 385/1, 2, 9, 11, 42, 24, 45, 47, 32, 36; 359/122, 123, 124, 127, 129, 135, 173, 182, 195, 246, 184, 156, 188

[56] References Cited

U.S. PATENT DOCUMENTS

| | | | |
|---|---|---|---|
| 3,670,165 | 6/1972 | Kinsel | 370/2 |
| 3,671,747 | 6/1972 | Duguay | 370/2 |
| 4,507,776 | 3/1985 | Smith | 385/2 |
| 4,558,921 | 12/1985 | Hasegawa et al. | 350/96.29 |
| 4,700,339 | 10/1987 | Gordon et al. | 370/3 |
| 4,881,788 | 11/1989 | Doran | 350/96.29 |
| 4,932,739 | 6/1990 | Islam | 350/96.15 |
| 4,941,738 | 7/1990 | Olsson | 370/2 |
| 4,973,124 | 11/1990 | Kaede | 359/127 |
| 5,020,050 | 5/1991 | Islam | 370/4 |
| 5,023,949 | 6/1991 | Auracher et al. | 370/2 X |
| 5,035,481 | 7/1991 | Mollenauer | 350/96.16 |
| 5,063,559 | 11/1991 | Marcuse | 359/127 |

*Primary Examiner*—Brian Healy
*Attorney, Agent, or Firm*—B. H. Freedman

[57] ABSTRACT

The single-wavelength bit-rate capacity of an ultra long distance soliton transmission system is increased by using a combination of polarization and time-division multiplexing. More specifically, two streams of differently (preferably orthogonally) polarized solitons are interleaved (time division multiplexed) at a transmitter, and later separated at the receiver to recover both data streams. The system operates at speeds of up to 7.5 GHZ and provides very thorough separation of channels required for $10^{-12}$ error rates at distances of 9000 km.

22 Claims, 6 Drawing Sheets

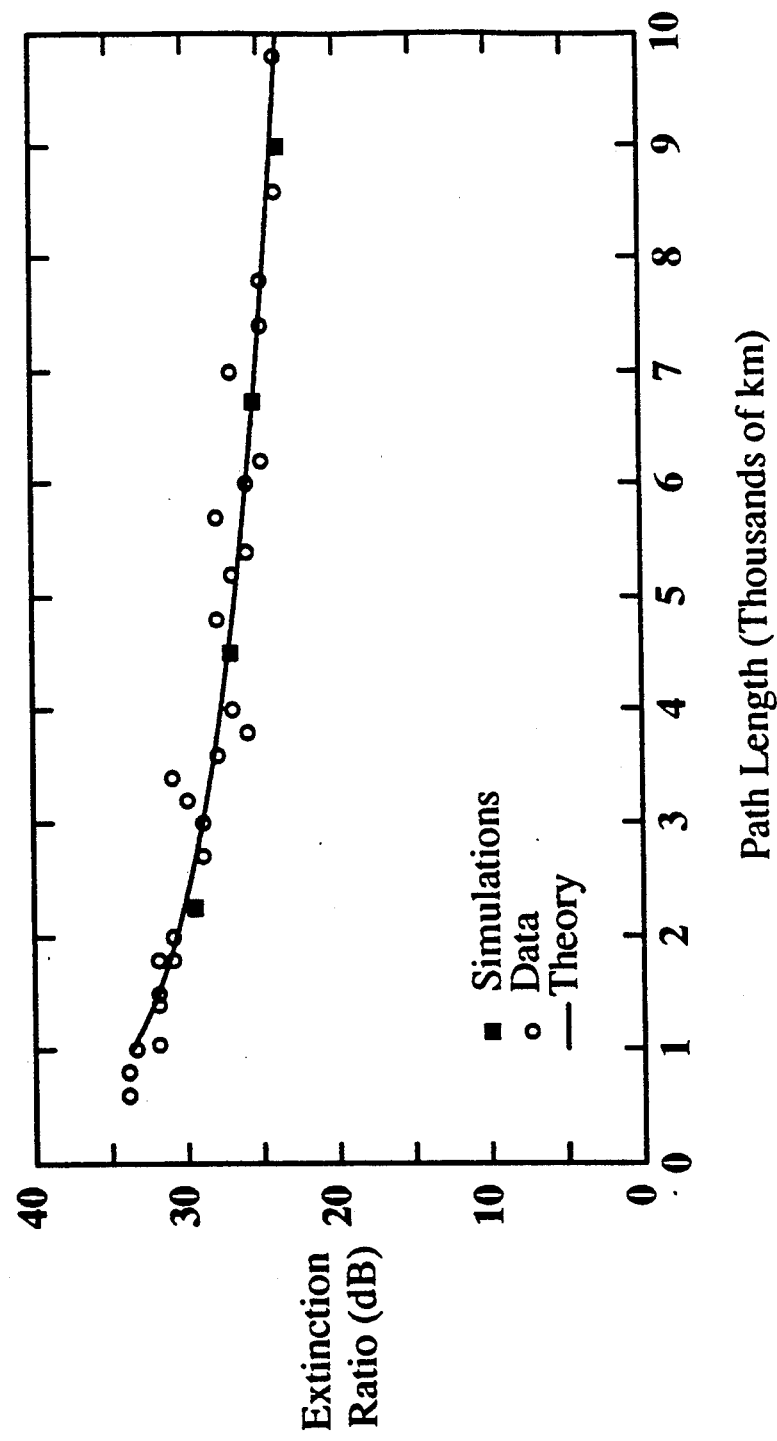

POLARIZATION MULTIPLEXING DEVICE WITH SOLITONS AND METHOD USING SAME

FIELD OF THE INVENTION

This invention relates generally to optical fiber communications and in particular to multiplexed communications using solitons.

BACKGROUND OF THE INVENTION

The advantages of using solitons (or, more precisely, shape maintaining pulses of electromagnetic radiation that can exist in single mode optical fiber) in optical fiber communication arrangements, has been discussed in many publications of late. Typical are U.S. Pat. No. 4,406,516 issued on Sept. 27, 1983 to A. Hasegawa, an article by A. Hasegawa et al., *Proceedings of the IEEE*, Volume 69(9), pages 1145-1150 (1981), and an article by applicant that appeared in *Physics World*, September, 1989, page 29 et seq., all of which are incorporated herein by reference.

It is well known that, in order for a pulse to remain a soliton, all its parts are required to maintain a common state of polarization, in spite of a constant evolution in that state of polarization caused by the fiber's birefringence. However, it was not known whether a series of solitons launched with a common polarization and having a common history would, as they traverse a transmission system, emerge with a common state of polarization, on a pulse to pulse basis. A pulse's history can be modified by two things: (1) changes in the birefringence of the fiber segments making up the system, and (2) the spontaneous emission noise (ASE) that is superimposed at random on the individual pulses. The former changes tend to be on a very slow time scale (typically minutes or longer), so that they are easily compensated by an automatic polarization controller device at the output of the system. Thus, only effects of the ASE have the potential to cause pulse-to-pulse changes in the polarization state of the soliton stream.

SUMMARY OF THE INVENTION

In order to implement our invention, we have estimated the effects of the ASE noise from numerical simulations of transmission through a system with random birefringence, and have studied the effects analytically and experimentally. Our simulations show that the polarization of solitons traversing a 9000 km long system (consisting of dispersion shifted fiber with polarization dispersion parameter $\Delta\beta/h^{\frac{1}{2}}=0.2$ ps/km$^{\frac{1}{2}}$ and amplifiers spaced $\sim 30$ km apart) is remarkably well preserved.

In accordance with our invention, the capacity of a soliton system is essentially doubled by time multiplexing (i.e., interleaving) two streams of differently (preferably orthogonally) polarized pulses at a transmitter, and by separating the two streams at the receiver to recover both data streams. The system operates at speeds of 5 to 10 Gbits/s and provides very thorough separation of channels required for $10^{-12}$ error rates.

BRIEF DESCRIPTION OF THE DRAWINGS

FIG. 7 is a graph illustrating the agreement of computer simulations, analytical models, and experimental results confirming the operation of our invention.

DETAILED DESCRIPTION

The present invention, which utilizes a combination of polarization and time division multiplexing in a soliton communication system, is based on the fact that solitons typically occupy only a small fraction ($<20\%$) of the bit period, so that several streams of pulses carrying information from independent sources can be interleaved in time and multiplexed with different polarizations. At the receiver, polarization separation can be performed on a received signal, as has been confirmed experimentally and theoretically. This is described in more detail below.

Before continuing with the description of our invention, it is important to make clear that the polarization separation possible with solitons is not possible with other pulses. In particular, it is not possible with transmission of more or less square pulses, in a non-return-to-zero (NRZ) format, transmitted at the wavelength of zero chromatic dispersion, ($\lambda_0$). In an article by C. D. Poole, "Measurement of Polarization-Mode Dispersion in Single-Mode Fibers With Random Mode Coupling," *Opt. Lett.* 14, pp. 523-525, May, 1989, it has been shown that the transmission system, which looks like a stack of many wave-plates of random strengths and random orientations, can be characterized by the overall time delay difference, $\delta T(\lambda)$, between "fast" and "slow" principal states of polarization. $\delta T$ has a probability distribution with zero mean $<\delta T>=0$, with standard deviation $\sqrt{<\delta T^2>}=\Delta\beta/h^{\frac{1}{2}}\sqrt{Z}$, where Z is the overall system length. For example, for a system with $\Delta\beta/h^{\frac{1}{2}}=0.2$ ps/km$^{\frac{1}{2}}$, and Z=10,000 km, $\sqrt{<\delta T^2>}=20$ ps.

Figure 1:
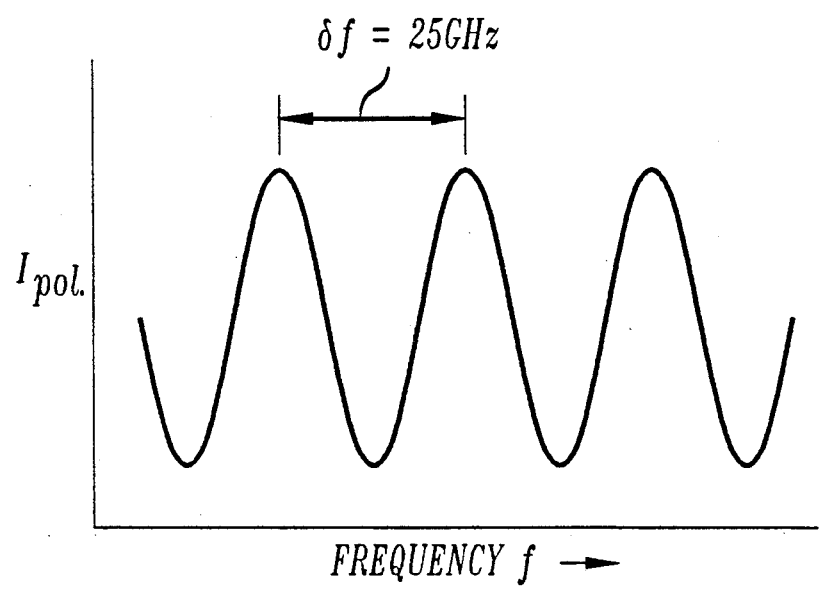
FIG. 1 illustrates the typical variation of intensity $I_{pol}$ of initially polarized non-soliton pulses having a particular state of polarization (SOP), with optical frequency, at the output of a long, randomly birefringent fiber. The typical value of $\delta f$ is 25 GHz for a 10,000 km long system with polarization dispersion parameter $\sim 0.2$ ps/km$^{\frac{1}{2}}$.

The above cited article by Poole also reveals that the polarization will have an average period, $\delta f$, with changing optical frequency, given by $\delta f = (2\sqrt{<\delta T^2>})-1$. Thus, for $\sqrt{<\delta T^2>}=20$ ps, one obtains $\delta f=25$ GHz, and the change in intensity of one output state of polarization (SOP) at the system output as a function of frequency would tend to behave as shown in FIG. 1. Now in an NRZ system, $\sim 10,000$ km long, because of the fact that the fiber's nonlinear effect is not canceled out by dipersion (as it is for solitons), the pulses suffer a large net nonlinear phase shift, $\phi_{nl}>\pi$, so that the frequency spectrum of the pulse stream is typically broadened out over many tens of GHz, for systems transmitting at multi-Gbits/s rates. This is described in an article by D. Marcuse, "Single-Channel Operation in Very Long Nonlinear Fibers with Optical Amplifiers at Zero Dispersion" Journal of Lightwave Technology, Vol. 9, No. 3, p, 356, March 1991. In view of the rapid variation of polarization with frequency shown in FIG. 1, the various frequency components of the pulse will be polarized in many different ways, so the pulses will be depolarized. Thus, there is no possibility of obtaining the necessary separation of initially orthogonally polarized pulse streams for NRZ, as there is for solitons.

Figure 2:
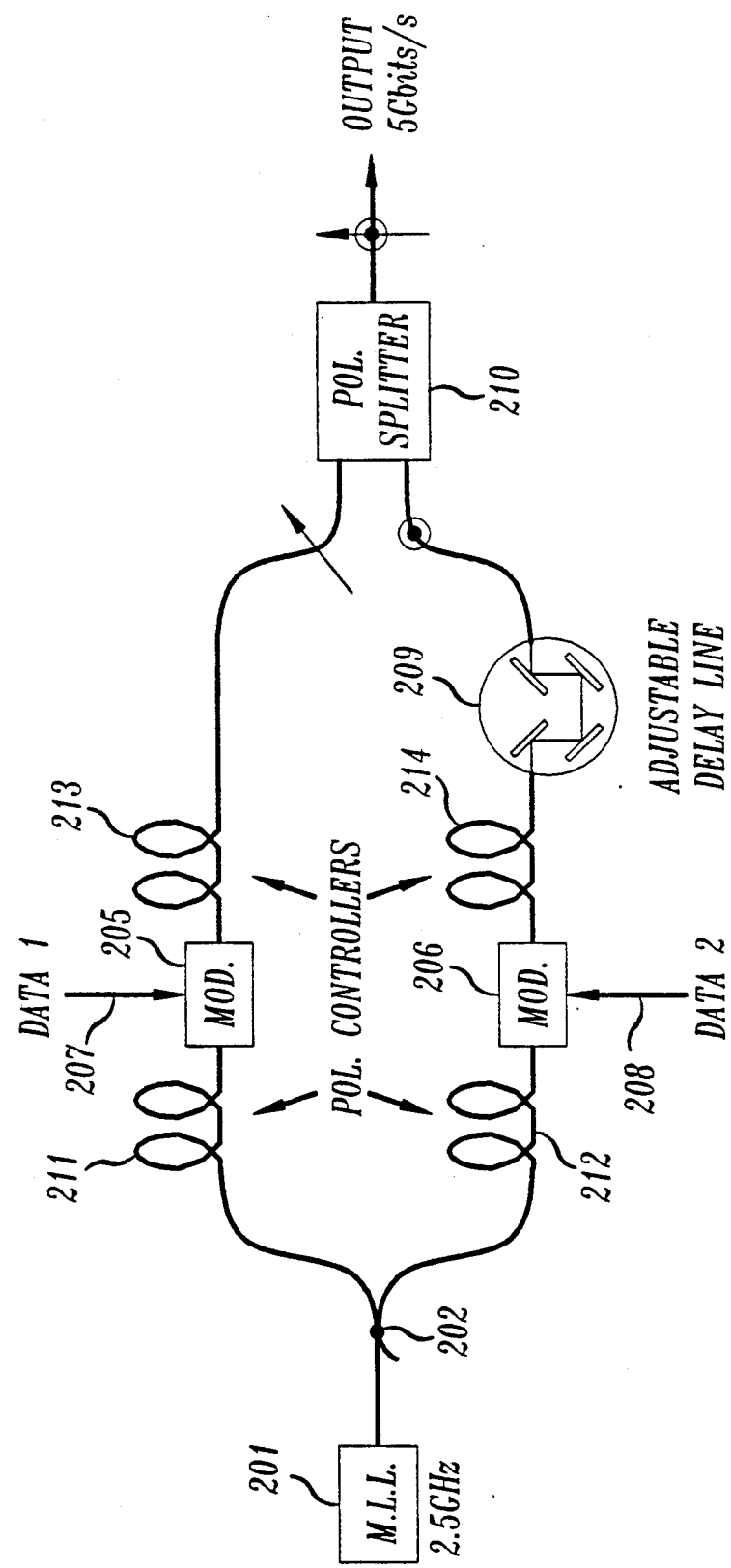
FIG. 2 illustrates a schematic of a multiplexer arranged in accordance with the present invention.

In order to understand the principles of the present invention, and to simplify the description, the multiplexing of 2 channels of 2.5 Gbits/s each, into a single 5 Gbits/s channel, and the corresponding demultiplexing at the receiving end, is first described in conjunction with the multiplexer of FIG. 2.

The signal source for the two channels is a single, mode-locked laser 201, producing ~35-50 ps wide soliton pulses at a 2.5 GHz rate. Its output is split into two soliton pulse streams having essentially orthogonal polarizations, in a splitter 202, and each half separately modulated (with different information bearing signals labeled Data 1 and Data 2) in modulators 205 and 206. Modulator 205 receives a first information bearing signal or data stream on line 207, while modulator 206 receives a second data stream on line 208. The two soliton pulse streams then recombine in a splitter 210, but only after one of the pulse streams is delayed by one-half of the 2.5 Gbit/s bit period in an adjustable delay line 209 so that the two pulse streams are interleaved in time.

A few practical details concerning the apparatus of FIG. 2 are in order here. The modulators 205, 206 should preferably be of the $LiNbO_3$, balanced Mach-Zehnder type, as those produce virtually no chirping of the soliton pulses, and have an adequate on-off ratio (~20 dB). The required linear polarizations at the inputs to modulators 205, 206, and for the polarization multiplexing itself, can either be maintained through the use of (linear) polarization-preserving fiber throughout the multiplexer, or through the use of polarization controllers, such as controllers 211-214, both before and after modulators 205, 206 as shown in FIG. 2. Polarization controllers 211-214 may be arranged as described in an article by H. C. Levevre, "Single-Mode Fiber Fractional Wave Devices and Polarization Controllers", Electronics Letters, Vol. 16, p. 778, 1980. For the temporal interleaving of the two soliton pulse streams, it is necessary to make precise adjustment of the relative lengths of the two arms of the multiplexer. This can be done with adjustable delay line 209 which is shown interposed between the output of modulator 206 and polarization splitter 210. Nevertheless, delay line 209 is not absolutely necessary. It is also possible to trim the length of one or the other arm, through one or two trials, to within a few picoseconds of the correct length so the apparatus may remain allwaveguide throughout.

Figure 3:
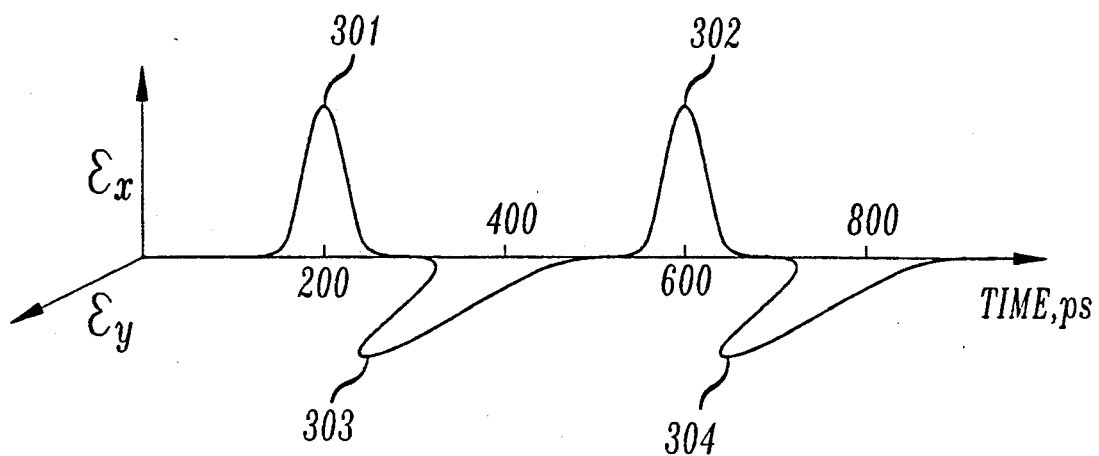
FIG. 3 illustrates the soliton pulse field envelopes at the output of the multiplexer of FIG. 2.

The original soliton pulse stream output from the correctly adjusted multiplexer of FIG. 2 would appear as shown in FIG. 3. The x and y axes represent intensities of pulses of different (orthogonal) polarizations. As an example, soliton pulses 301 and 302 have an initial polarization along the axis and a period of 400 ps. Soliton pulses 303 and 304 have an orthogonal (y direction) polarization, the same period, and are time interleaved with the first series of pulses. Information is carried in the pulse streams by virtue of the presence or absence of pulses at the expected or nominal positions on the time axis. Note that launching the soliton pulses as in FIG. 3 not only achieves the potential for combined time and polarization division demultiplexing at the receiving end, but also virtually eliminates the potential for cross-phase modulation, and hence virtually eliminates the potential for interaction during transmission, between the two channels.

To verify that the multiplexer is adjusted correctly, a sample of the output pulse stream can be taken, with the two polarization components equally weighted, so that either its optical spectrum, or the microwave spectrum of the detected sample can be observed. In general, the randomly modulated pulse stream will exhibit a line spectrum whose components are separated by multiples of 2.5 GHz. For correct adjustment of the relative arm lengths (perfect temporal interleaving of the soliton pulses), the odd harmonics of 2.5 GHz will disappear, leaving only components spaced by multiples of 5 GHz. Thus, perhaps the simplest device to check on the temporal adjustment could be made from a detector and a simple resonant circuit tuned to 2.5 GHz.

The transmission line itself must meet two requirements for successful polarization division multiplexing/demultiplexing. First, the overall difference in system gain for any two orthogonal polarizations must be less than a few dB. Second, the $\delta T$ for the system for any two orthogonal polarizations must be small compared to a bit period. The first requirement can be met by using completely non-polarizing wavelength division multiplexing (WDM) couplers for pump injection (such as those made by JDS Optics, which use essentially normal incidence reflection from interference filters), and by keeping all other potentially polarizing components to a minimum. Such polarization independent gain has been achieved in a recirculating loop which contained nothing but dispersion shifted and amplifier fibers, JDS couplers, a non-polarizing fiber-fusion coupler for input/output, and one nearly non-polarizing isolator. The second requirement is easily met with presently available dispersion shifted fibers, for which the polarization dispersion parameter $(\Delta\beta/h^{\frac{1}{2}})$ is now typically $\leq 0.2$ ps/nm/km, so that $\sqrt{<\delta T^2>} \sim 20$ ps or less, even for the greatest system length (~10,000 km).

To demultiplex the polarized and interleaved soliton pulses at the receiving end, the emerging, and arbitrary, states of polarization must be transformed so that the unwanted channel in each arm of the demultiplexer can be optimally rejected by a linear polarization analyzer. This transformation may be done with the electrically driven and continuously adjustable polarization controller of the kind recently built and tested by F. Heismann et al., as described in *Electronics Letters*, Vol. 27, No. 4, February 1991, p. 377-79. In the case where the overall gains for orthogonal polarizations are substantially equal, the polarizations for the two channels would remain orthogonal throughout. In that event, one polarization controller would be required, and could transform the data streams into two orthogonal linear polarizations. The demultiplexer could then be arranged as shown in FIG. 4.

Figure 4:
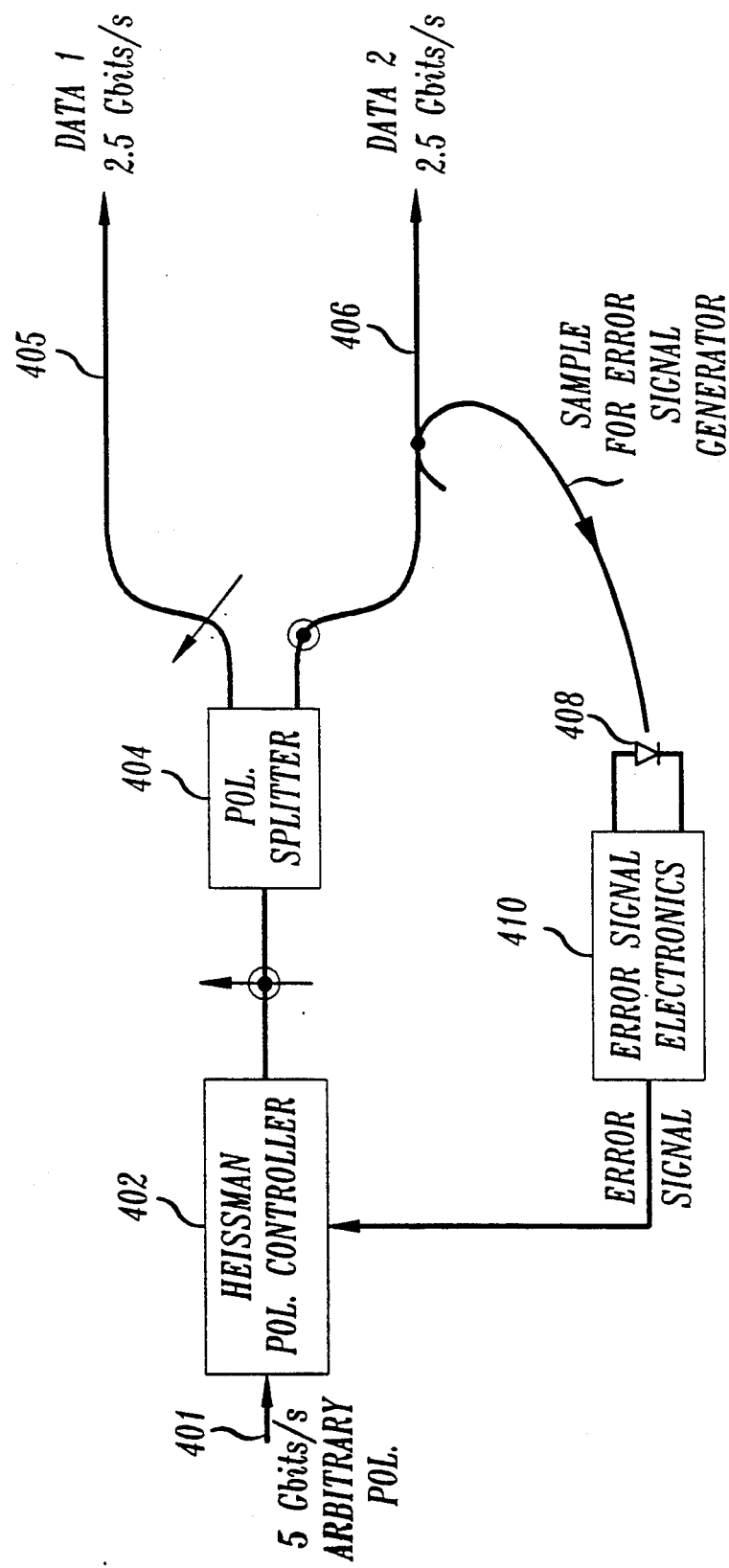
FIG. 4 is a schematic diagram of the demultiplexer to be used when the incoming signals are orthogonally polarized.

As shown in FIG. 4, the received multiplexed signal on input 401 is a 5 Gbits/s stream of pulses with arbitrary polarization. This input is applied to a Heismann polarization controller 402, which can transform an arbitrary and varying input state of polarization into any desired specific output state of polarization. This transformation can be used to change the polarization state of the incoming 5 Gbits/s data stream into a state (e.g., linear polarization) which allows separation into two 2.5 Gbits/s pulse streams on outputs 405 and 406, using only a polarization splitter 404. The pulse stream on output 405 is modulated by one of the information bearing signals, Data 1, while the pulse stream on output 406 is modulated by the other information bearing signal, Data 2. A portion of the signal on output 406 is fed back to controller 402 via a detector 408 and error signal electronics 410, which includes a 2.5 GHz microwave resonant filter that generates an error signal necessary for the controller 402 to track and correct for the slow variations in the polarization state of the incoming 5 Gbits/s pulse stream.

Figure 5:
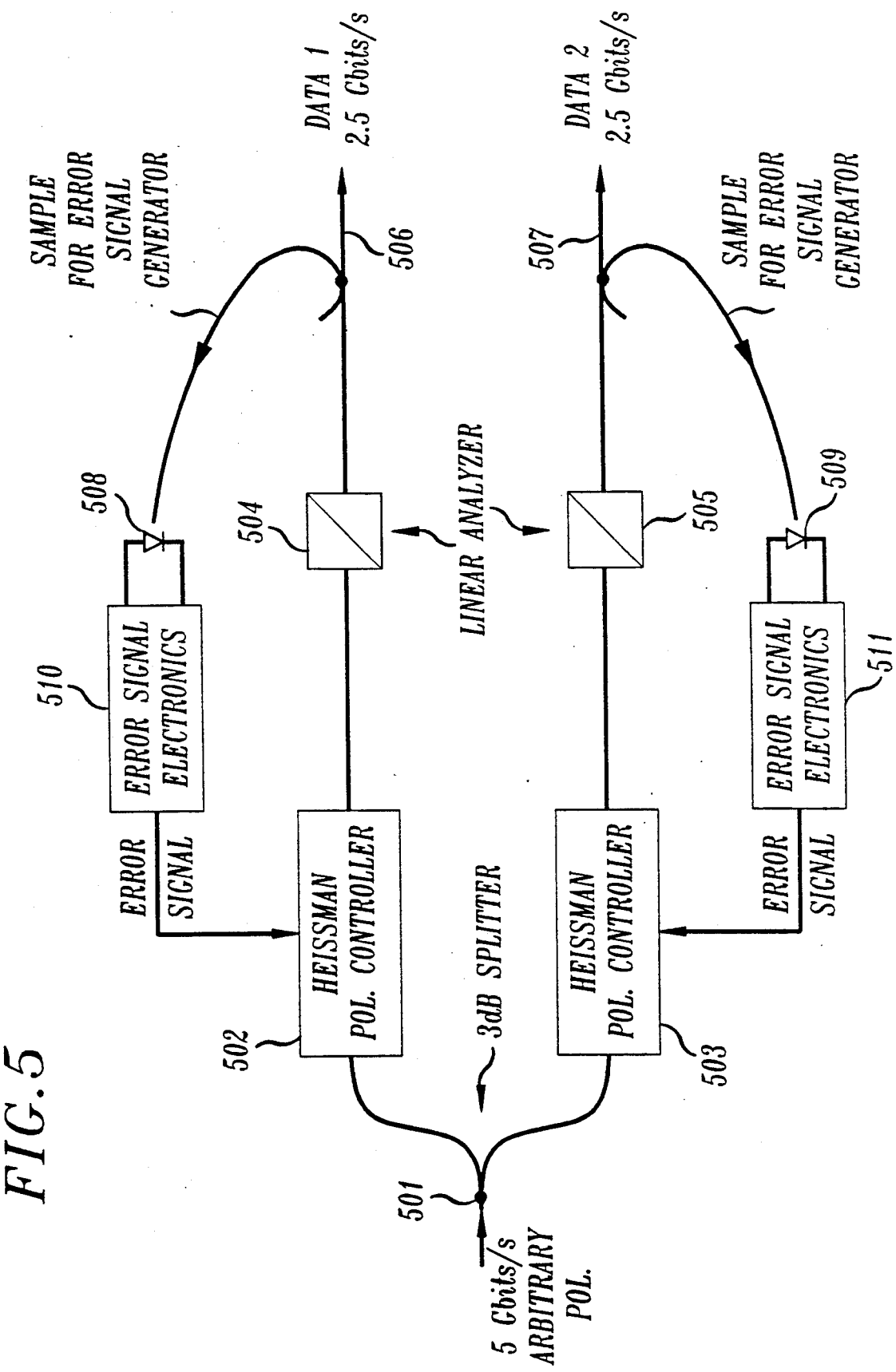
FIG. 5 is a schematic diagram of the demultiplexer to be used when the incoming signals are not perfectly orthogonally polarized, because of a variation in system gain with polarization.

In the more general case, where there will be a small but significant difference in gain for orthogonal polarizations, so that the emerging polarizations of the two channels as contained in the pulse stream applied to the demultiplexer will no longer be perfectly orthogonal. In that case, as shown in FIG. 5, a non-polarizing 3 dB splitter 501 is used to split the input pulse stream and apply a (generally equal) portion to each of two similar Heismann polarization controllers 502 and 503. The output of each controller is applied to a respective linear analyzer 504, 505, which nulls out the unwanted channel in each arm by making its polarization linear and orthogonal to the output from controller 502 or 503. Data 1 is thus recovered on output 506, while data 2 is recovered on output 507.

To generate an error signal for each polarization controller 502, 503, the technique described above in conjunction with FIG. 4 may be used. Thus, a sample of the 2.5 Gbits/s stream from each output 506, 507 of the demultiplexer is applied to a respective detector 508, 509 and passed through a corresponding 2.5 GHz microwave resonant filter 510, 511. Both polarization controllers 502, 503 are adjusted for maximum signal. (For perfectly orthogonal channels, as in FIG. 4, this need be done for only one arm.) To remain locked on to the maximum, as is well-known and has been demonstrated by Heismann in the above-cited reference, it may sometimes be necessary to dither one element of the polarization controller and to use phase sensitive detection to derive the appropriate error signal.

To see why a maximum of the 2.5 GHz signal is needed, note that for the worst possible adjustment of the polarization controller, which would tend to output roughly equal signals from each data stream at each arm of the demultiplexer, the odd multiples of 2.5 GHz would tend to disappear from the microwave spectrum.

Figure 6:
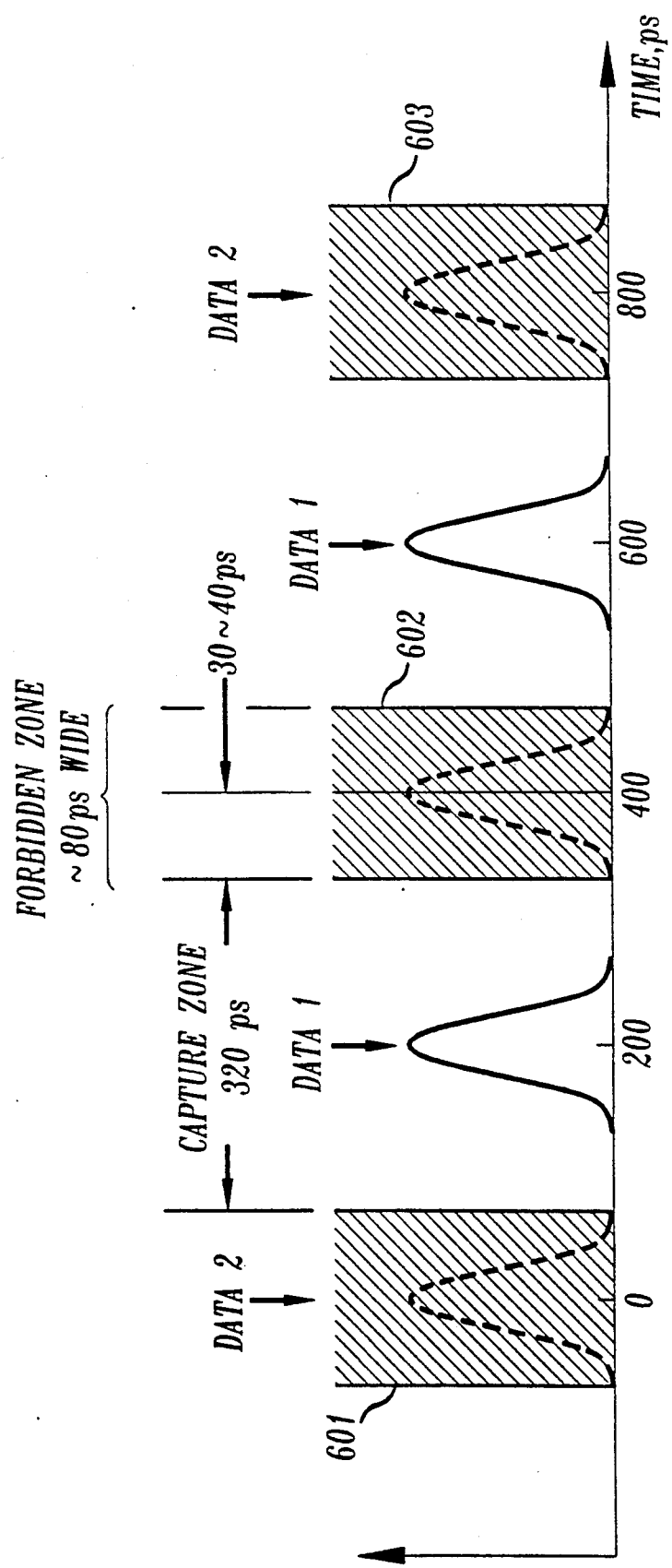
FIG. 6 is a diagram showing forbidden and capture zones for the asymmetrical time-division demultiplexing to be used in conjunction with the polarization division demultiplexing.

Simulations that we have conducted show that the field vectors for the pulses from a given channel, when the mean is converted to a linear polarization, rarely stray by more than about ±3.3° from the mean. More precisely stated, the angular deviation has a Gaussian distribution about the mean (0°), whose standard deviation, $\sigma$, is about 3°. Thus, for pulses of angular deviation $\leq 7\sigma$ (the probability of pulses deviating $>7\sigma$ is only about $10^{-10}$), a linear analyzer can eliminate all but $(\sin 21°)^2$, or about 15% of the intensity of the most deviant of those pulses of the channel carrying data 2 signals from the channel carrying data 1 signals, and vice versa. Since such leakage is small relative to large excursions of the ASE noise, it is not expected to affect the bit error rate significantly. Note also that it is comparable to the modulator's leakage of energy into the "zeros" at the transmitter. Nevertheless, if necessary, the potential for errors could be further reduced by slightly reducing the time window for detection in each channel, as shown in FIG. 6. Thus, it is possible to do an asymmetrical time division demultiplexing as well, so that pulses arriving in a narrow time zone about the borders of the normal 2.5 Gbits/s bit period would be suppressed, or stated differently, so that only pulses within a desired time window would be detected and further processed. The suppression just described can be achieved either with another electro-optic modulator, or electronically following detection. For example, if the "forbidden" zone 601, 602, 603 in FIG. 6 extends about ±3$\sigma$ on either side of the border, where $\sigma$ is the standard deviation of the timing jitter described by J. P. Gordon and H. A. Haus, "Random Walk of Coherently Amplified Solitons in Optical Fiber Transmission," *Opt. Lett.* 11, pp. 665–667, October 1986, then the probability that the unwanted pulses would lie outside that zone would be $<10^{-3}$. Since a typical value for $\sigma$, given reasonable assumptions about the amplifier spacings and noise figures, is about 13 ps at 9000 km, about 80 ps in total would be eliminated from the normal 400 ps bit period. On the other hand, for $10^{-12}$ error rate, the Gordon-Haus jitter requires a total width of about $2 \times 7 \times \sigma$, or about 180–200 ps in this case. Thus, the 320 ps capture zone 604, 605 would allow a large safety margin for the net 5 Gbits/s single-wavelength rate. One could, in fact, have a single-wavelength rate closer to 7.5 Gbits/s (two 3.75 Gbits/s channels multiplexed overall together. This would have adequately large, 267−80=187 ps effective capture window). Thus, as asserted earlier, the technique described here should allow one to double, or at least nearly double the single-wavelength capacity of an ultra-long-distance soliton transmission system.

In addition to the simulations described above, we have made direct experimental measurement of the degree of polarization of a train of ~50 ps solitons after they have traversed various distances up to and including 9000 km in a recirculating loop. That is, by converting the emerging polarization into a precisely linear one, we have measured the extinction ratio (intensity ratio of light transmitted through a linear analyzer oriented parallel and perpendicular to the emerging polarization), and we find a value of 24 dB at 9000 km, and correspondingly greater ratios for shorter distances. Furthermore, our experimental measurement is in close agreement with an analytic theory which says that the extinction ratio thus measured should be given by the signal to noise ratio at the given distance. Thus, we have three arguments or pieces of evidence that solitons indeed remain well polarized, viz., the numerical simulations, the experimental measurements, and the analytic theory. The close agreement of all three techniques for verifying the operation of our invention is illustrated in FIG. 7. It can be seen in that figure that the extinction ratio for a path length of about 9000 km is about 24 dB, indicating that less than 1/250 of the energy in the desired polarization direction is lost to the other polarization direction.

Various modifications and adaptations may be made to the present invention by those skilled in the art. For this reason, it is intended that the invention be limited only by the appended claims. Thus, for example, while multiplexing of two signals was shown and described above, it is to be recognized that additional signals can be combined in the same way, provided that successive signals are polarized in appropriately distinct modes.

It should also be kept in mind that the single-wavelength capacity of a soliton system, whatever it is, could be multiplied at least several times by the use of WDM (wavelength division multiplexing), as described in an article by L. F. Mollenauer, S. G. Evangelides and J. P. Gordon in *Jrnl Lightwave Tech.* Vol. 9, No. 3, March 1991, pp. 362-367, entitled "WDM With Solitons in Ultra Long Distance Transmission Using Lumped Amplifiers."

We claim:

1. Apparatus for multiplexing at least first and second information bearing signals on a fiber optic transmission medium, comprising
    means for generating a stream of soliton pulses on said transmission medium at a first frequency,
    means for splitting said stream of soliton pulses into at least first and second pulse streams having essentially orthogonal polarizations;
    means for modulating said first and second pulse streams with said first and second signals, respectively, to produce first and second modulated signals;
    means for time interleaving said first and second modulated signals; and
    means for applying said interleaved signal to said transmission medium.

2. The invention defined in claim 1 further including means at a receiver for separating said interleaved signal into first and second recovered pulse streams having pulses with essentially orthogonal polarizations; and
    means for recovering said first and second information bearing signals.

3. An optical communication system including
    means at a transmitter for interleaving first and second information bearing streams of soliton pulses onto an optical transmission medium, said first and second pulse streams having essentially orthogonal polarizations; and
    means at a receiver for recovering said first and second information bearing signals.

4. A soliton communication system, comprising
    means for modulating a first stream of soliton pulses with a first signal;
    means for modulating a second stream of soliton pulses with a second signal;
    means for interleaving said first and second pulse streams with essentially orthogonal polarizations; and
    means for applying said interleaved pulse stream to an optical transmission medium.

5. A multiplex transmitter for use in an optical communication system, comprising
    a source of soliton pulses at a first frequency;
    means for modulating a first stream of said soliton pulses with a first information bearing signal, the output of said modulating means having a first polarization;
    means for modulating a second stream of said soliton pulses with a second information bearing signal, the output of said modulating means having a second polarization approximately orthogonal to said first polarization; and
    means for interleaving said first and second streams of modulated soliton pulses to generate a multiplexed signal at twice said first frequency.

6. The invention defined in claim 5 wherein said interleaving means includes an adjustable delay line adapted to delay said second stream of modulated soliton pulses.

7. A lightwave communication system including
    means for splitting a stream of soliton pulses into a plurality of individual pulse streams having different polarizations;
    means for modulating each of said soliton pulse streams with a different information bearing signal; and
    means for time interleaving each of said modulated pulse streams to generate a multiplexed stream of soliton pulses.

8. An optical multiplexer comprising
    means for generating first and second streams of soliton pulses having orthogonal polarization;
    means for modulating said first and second streams with first and second data; and
    means for interleaving the resulting first and second modulated streams to form a multiplexed signal.

9. The invention defined in claim 8 wherein said generating means includes
    a source of soliton pulses; and
    a polarizing pulse splitter.

10. The invention defined in claim 9 wherein said modulating means includes a pulse amplitude modulator.

11. The invention defined in claim 10 wherein said interleaving means includes an adjustable delay line.

12. A method of multiplexing at least first and second information bearing signals on a fiber optic transmission medium, comprising the steps of
    generating a stream of soliton pulses on said transmission medium at a first frequency,
    splitting said stream of soliton pulses into at least first and second pulse streams having essentially orthogonal polarizations;
    modulating said first and second pulse streams with said first and second signals, respectively, to produce first and second modulated signals;
    time interleaving said first and second modulated signals; and
    applying said interleaved signal to said transmission medium.

13. The method defined in claim 12 further including the step of separating, at a receiver, said interleaved signal into first and second recovered pulse streams having pulses with essentially orthogonal polarizations; and
    recovering said first and second information bearing signals.

14. An optical communication method including the steps of
    interleaving first and second information bearing streams of soliton pulses onto an optical transmission medium, said first and second pulse streams having essentially orthogonal polarizations; and
    recovering said first and second information bearing signals at a remote receiver.

15. A soliton communication method, comprising the steps of
    modulating a first stream of soliton pulses with a first signal;
    modulating a second stream of soliton pulses with a second signal;
    interleaving said first and second pulse streams with essentially orthogonal polarizations; and
    applying said interleaved pulse stream to an optical transmission medium.

16. A method of multiplex transmission in an optical communication system, comprising the steps of
    forming first and second streams of soliton pulses;

modulating said first stream of said soliton pulses with a first information bearing signal, the output of said modulating step having a first polarization;

modulating said second stream of said soliton pulses with a second information bearing signal, the output of said modulating step having a second polarization approximately orthogonal to said first polarization; and interleaving said first and second streams of modulated soliton pulses to generate a multiplexed signal.

17. The method defined in claim 16 wherein said interleaving step includes delaying said second stream of modulated soliton pulses using an adjustable delay.

18. A lightwave communication method including the steps of splitting a stream of soliton pulses into a plurality of individual pulse streams having different polarizations;

modulating each of said soliton pulse streams with a different information bearing signal; and time interleaving each of said modulated pulse streams to generate a multiplexed stream of soliton pulses.

19. A method of optical multiplexing comprising the steps of generating first and second streams of soliton pulses having orthogonal polarization;

modulating said first and second streams with first and second data; and interleaving the resulting first and second modulated streams to form a multiplexed signal.

20. The method defined in claim 19 wherein said generating step includes splitting the output from a single source of soliton pulses.

21. The invention defined in claim 19 wherein said modulating step includes pulse amplitude modulation.

22. The invention defined in claim 21 wherein said interleaving step includes adjusting the delay introduced in one of said pulse streams.

* * * * *